(12) United States Patent
Han

(10) Patent No.: US 7,604,045 B2
(45) Date of Patent: Oct. 20, 2009

(54) AIR CONDITIONER FOR VEHICLE

(75) Inventor: Seong Seck Han, Daejeon (KR)

(73) Assignee: Halla Climate Control Corporation, Daejeon (KR)

( * ) Notice: Subject to any disclaimer, the term of this patent is extended or adjusted under 35 U.S.C. 154(b) by 654 days.

(21) Appl. No.: 10/558,477

(22) PCT Filed: May 28, 2004

(86) PCT No.: PCT/KR2004/001264

§ 371 (c)(1),
(2), (4) Date: Nov. 28, 2005

(87) PCT Pub. No.: WO2004/106095

PCT Pub. Date: Dec. 9, 2004

(65) Prior Publication Data

US 2006/0283586 A1     Dec. 21, 2006

(30) Foreign Application Priority Data

May 29, 2003   (KR)  .................... 10-2003-0034356

(51) Int. Cl.
*B60H 1/00* (2006.01)
*F25B 29/00* (2006.01)
(52) U.S. Cl. .................... 165/202; 165/42; 165/43; 165/103; 165/124; 454/156; 454/160; 454/161; 62/244; 62/519; 62/525; 62/404

(58) Field of Classification Search ................ 165/202, 165/42, 43, 103, 124; 454/156, 160, 161; 62/244, 519, 525, 404
See application file for complete search history.

(56) References Cited

U.S. PATENT DOCUMENTS 3,809,151 A * 5/1974 Scheidel et al. ................ 165/42
5,836,380 A   11/1998 Takesita et al.

FOREIGN PATENT DOCUMENTS

| JP | 08276721 A | * | 10/1996 |
| JP | 11301252 A | * | 11/1999 |
| JP | 2003-127640 | | 5/2003 |
| KR | 1020020004342 A | | 1/2002 |

* cited by examiner

*Primary Examiner*—John K Ford
(74) *Attorney, Agent, or Firm*—Lowe Hauptman Ham & Berner, LLP

(57) ABSTRACT

Provided is an air conditioner for a vehicle, including a blower unit that blows air, an air conditioning case including an evaporator and a heater core, which are sequentially disposed in an airflow path, and an air inlet path that allows air to flow to an evaporator from the blower unit, wherein the airflow path includes a first path that allows air entered from the air inlet path to flow to a lower part of the evaporator and second and third paths that allow the air to flow to the lower part of the evaporator after passing through both sides of the evaporator. The air conditioner increases an amount of airflow and reduces airflow resistance since airflow paths are formed on both sides of the evaporator in addition to a direction perpendicular to the separator. Consequently, the airflow entering a lower part of the evaporator can be uniformly distributed.

4 Claims, 5 Drawing Sheets

AIR CONDITIONER FOR VEHICLE

TECHNICAL FIELD

The present invention relates to an air conditioner for a vehicle, and more particularly, to an air conditioner for a vehicle, which has an improved airflow line to increase an airflow into an airflow path of an air conditioning case, reducing airflow resistance, and distributing an airflow uniformly in an evaporator.

BACKGROUND ART

Generally, an air conditioner for a vehicle provides a comfortable atmosphere by controlling the temperature and humidity in the vehicle, and includes a cooling device for cooling and a heating device for heating the inside of the vehicle.

The cooling device generates cold air by absorbing latent heat required to vaporize a refrigerant from the surroundings of an evaporator while the refrigerant passes through the evaporator, and the cold air is supplied to the inside of the vehicle.

The heating device generates warm air by heating air surrounding a heater core by inducing cooling water from an engine room to the heater core, and the warm air is supplied to the inside of the vehicle.

A conventional air conditioner comprises an air conditioning case in which an airflow path is formed, a blower unit that blows air along the airflow path in the air conditioning case, and heat exchangers for generating cold air or warm air, sequentially disposed in the airflow path.

The air conditioner for a vehicle can be classified into a semi-center mounting type and a center mounting type according to the disposition of the blow unit. The semi-center mounting type has a blower unit on a side of an air conditioning case and supplies air along an airflow path of the air conditioning case through a guide pipe connected to the blower unit. The center mounting type has a blower unit mounted in an air conditioning case and supplies air along an airflow path of the air conditioning case directly from the blower unit. The semi-center mounting type has an advantage of utilizing an inner space for forming the airflow path, thereby providing a high degree of designing freedom. On the other hand, the center mounting type does not occupy much space in a vehicle, and can be used regardless of the location of the driver.

FIG. 1 is a cross-sectional view illustrating a conventional air conditioner for a vehicle.

Referring to FIG. 1, the conventional air conditioner comprises an air conditioning case 1 in which an airflow path 3 is formed, and an evaporator 4 for cooling and a heater core 6 for heating, which are sequentially disposed in the airflow path 3 of the air conditioning case 1. Here, a door 5 controls the closing/opening operations of a connection path for flowing the air that has passed through the evaporator 4 to the heater core 6. When a driver selects a desired air conditioning mode, the closing/opening operations of the door 5 are controlled according to the selected mode, and the conditioned air is sent inside the vehicle accordingly.

However, the conventional air conditioner for a vehicle has the following disadvantages.

First, an amount of air entered into the airflow path 3 of the air conditioning case 1 is not sufficient enough and an airflow resistance is high since the air flows only on a side of the evaporator 4.

Second, a uniform airflow distribution at the lower part of the evaporator 4 is difficult since the air enters only from above and below in the evaporator 4.

DETAILED DESCRIPTION OF THE INVENTION

Technical Goal of the Invention

Figure 1:
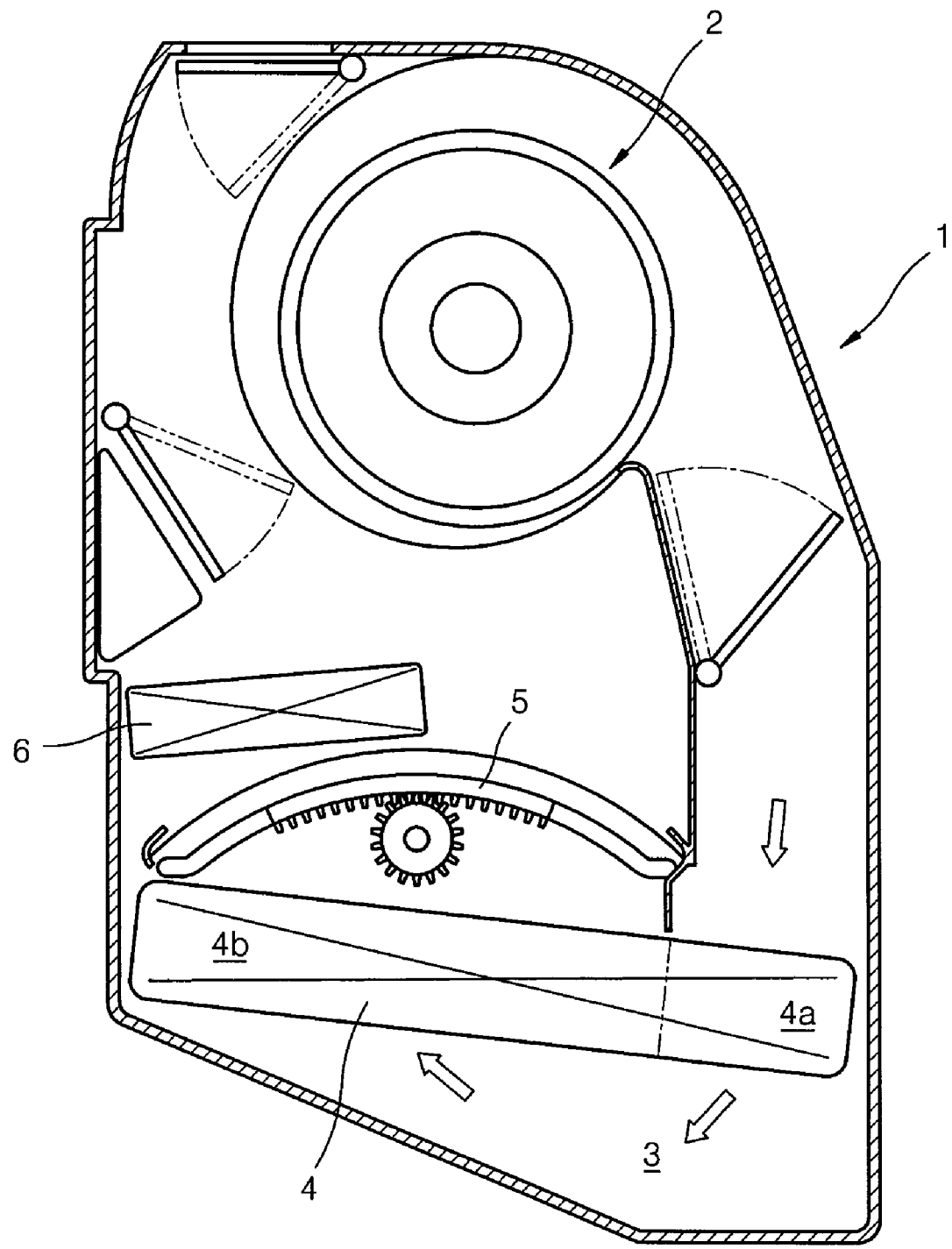
FIG. 1 is a cross-sectional view illustrating a conventional air conditioner for a vehicle.

The present invention provides an air conditioner for a vehicle, which has an improved airflow path to increase an amount of airflow and reduce an airflow resistance. The present invention also provides an air conditioner for a vehicle that can distribute an airflow uniformly at a lower part of an evaporator.

Disclosure of the Invention

According to an aspect of the present invention, there is provided an air conditioner for a vehicle that includes a blower unit that blows air, an evaporator and a heater core sequentially disposed in an airflow path, and an air conditioning case having an air inlet path that allows air to flow to an evaporator from the blower unit, wherein the air conditioning case includes a first path that allows air entered from the air inlet path to flow to a lower part of the evaporator and second and third paths that allow the air to flow to the lower part of the evaporator after passing through both sides of the evaporator, the first path including a cooling path which is an upper portion of the evaporator and detour paths that detour the evaporator.

The second and third paths may be disposed on both sides of the evaporator and connected to the first path. The second and third paths may form guide pipes protruded outward of both side of the air conditioning case. A portion of the air inlet path may be closed by an upper tank of the evaporator and the evaporator may be mounted having a slope in a direction from the upper tank to the lower tank.

Effect of the Invention

The air conditioner for a vehicle according to the present invention provides the following advantages.

First, an airflow entering the evaporator is increased and an airflow resistance is reduced since the air enters not only from above but also from both sides of the evaporator by forming airflow paths between an inner wall of the air conditioning case and both sides of the evaporator.

Second, a smooth and uniform distribution of the airflow at the lower part of the evaporator can be achieved since the airflow is evenly distributed along the both sides of the evaporator.

Third, a cooling efficiency is improved since the air that has passed through the first path is cooled twice.

Fourth, a discharge ability of condensed water is improved since the evaporator is formed to have a downward slope in a direction of the airflow and a drain hole is formed in a bottom wall of the air conditioning case corresponding to a location directly below the end part of the evaporator.

Fifth, a slim air conditioner for a vehicle can be manufactured by disposing the evaporator approximately parallel to the heater core. The air conditioner can further be slimmed by using a sliding door for controlling a closing/opening operation of the connection path that connects the evaporator and the heater core.

BEST MODE FOR CARRYING OUT THE INVENTION

The present invention will now be described more fully with reference to the accompanying drawings in which exemplary embodiments of the invention are shown.

Figure 2:
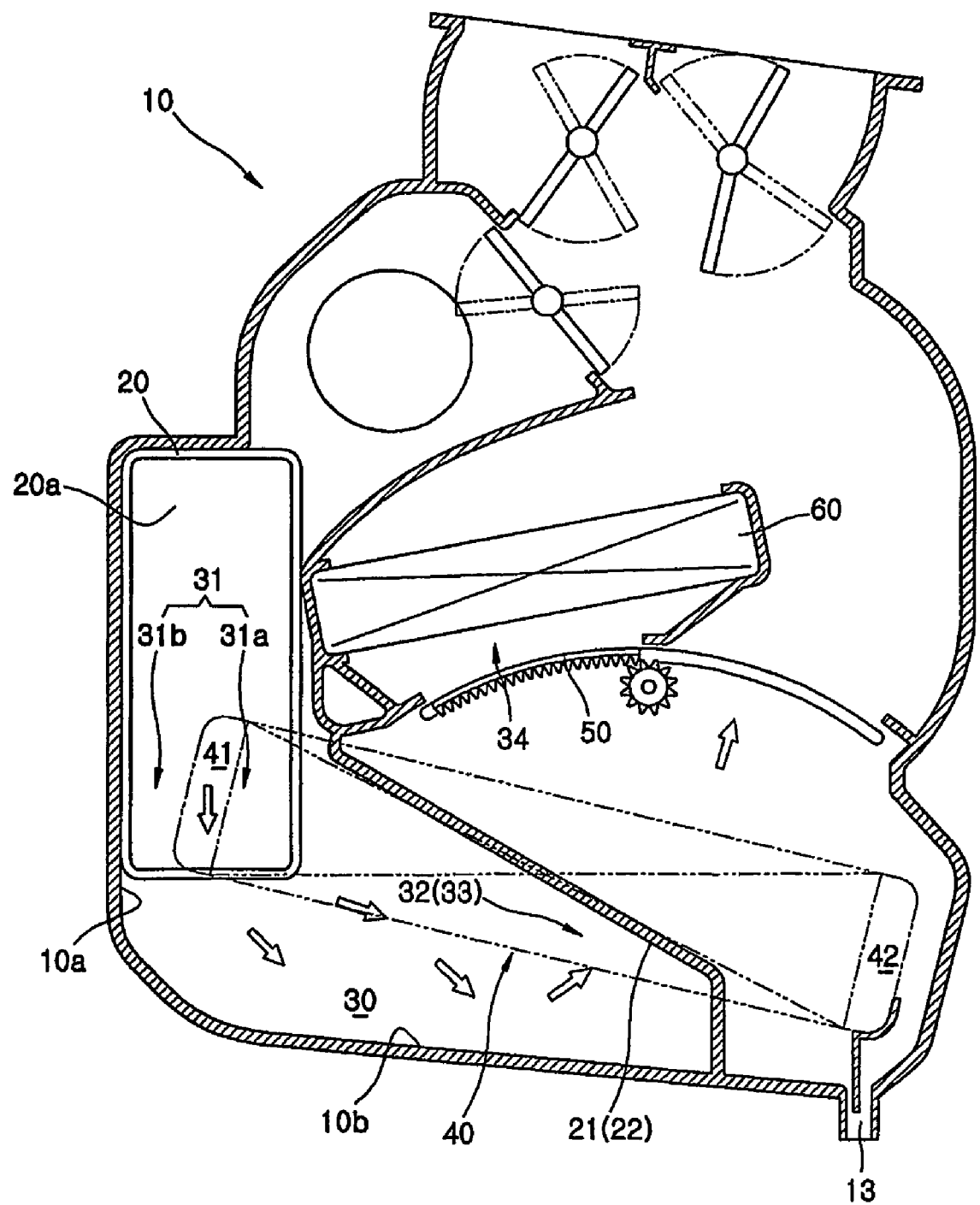
FIG. 2 is a cross-sectional view illustrating an air conditioner for a vehicle according to an embodiment of the present invention.
Figure 3:
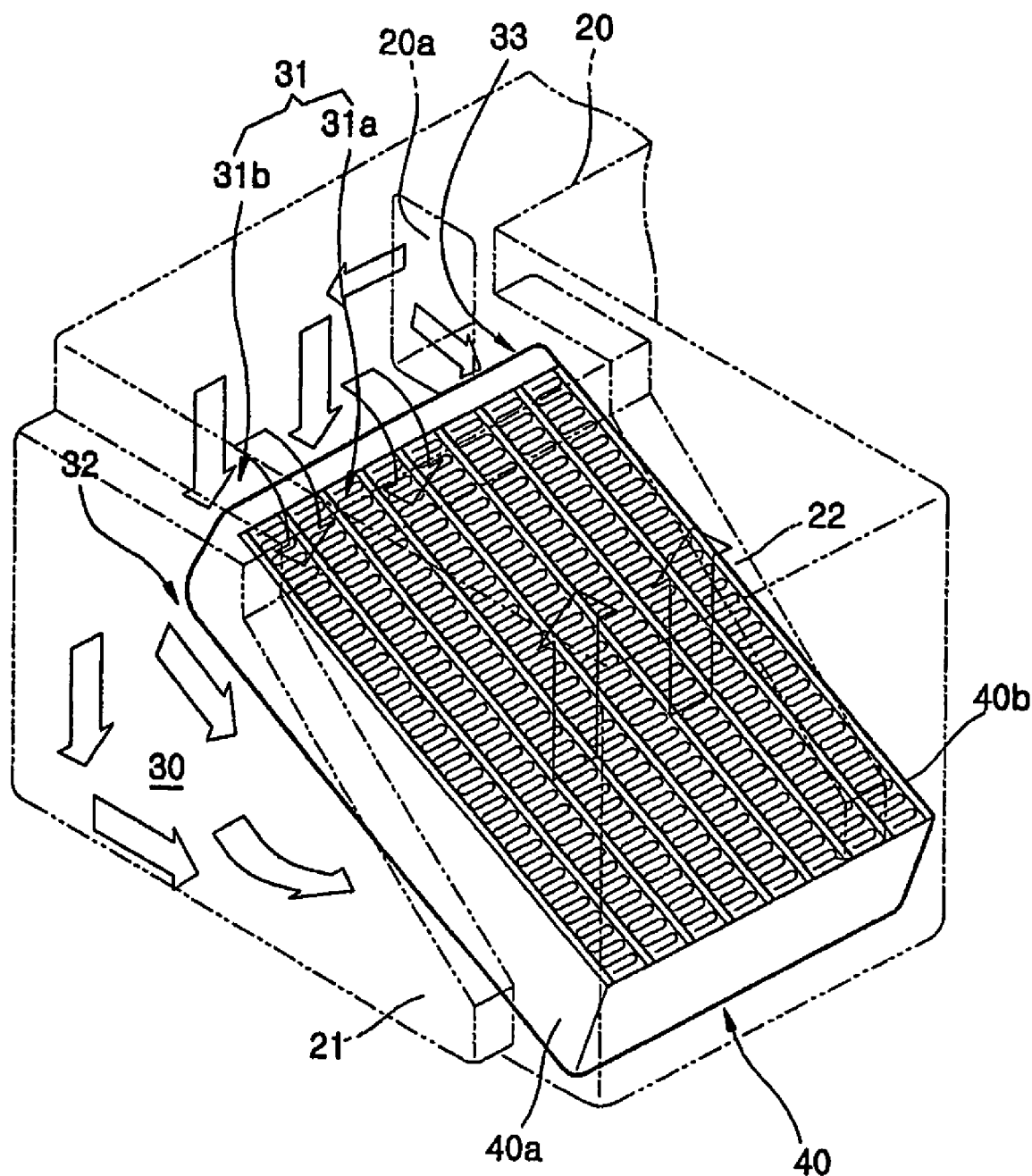
FIG. 3 is a perspective view illustrating a flow of air in an airflow path of FIG. 2.

FIG. 2 is a cross-sectional view illustrating an air conditioner for a vehicle according to an embodiment of the present invention, and FIG. 3 is a perspective view illustrating a flow of air in an airflow path of FIG. 2.

Referring to FIGS. 2 and 3, an air conditioner for a vehicle according to an embodiment of the present invention includes an air conditioning case 10 in which an airflow path 30, a blower unit (not shown) that blows air toward the air conditioning case 10, disposed on a side of the air conditioning case 10, and an air inlet path 20 are formed. An evaporator 40 and a heater core 60 are sequentially disposed in the airflow path 30. The air inlet path 20 allows air to flow from the blower unit to the evaporator.

The evaporator 40 is disposed approximately horizontally on a bottom wall 10b of the air conditioning case 10. The evaporator 40 can also be disposed having a slope such that a higher elevation in the upper stream and a lower elevation in the down stream of the air flow in the airflow path 30.

According to an aspect of the present invention, both sides 40a and 40b of the evaporator 40 are separated from an inner wall 10a of the air conditioning case 10. Accordingly, the airflow path 30 is divided into three paths, that is, a first path 31 through which air entered through an air inlet 20a of the air inlet path 20 flows directly to a lower part of the evaporator 40, and second and third paths 32 and 33 through which air entered through an air inlet 20a of the air inlet path 20 flows to the lower part of the evaporator 40 after flowing along the sides 40a and 40b of the evaporator 40. The second and third paths 32 and 33 are respectively formed between the sides 40a and 40b of the evaporator 40 and the inner wall 10a of the air conditioning case 10.

Upper parts of the second and third paths 32 and 33 are preferably partitioned by guide means for guiding the air entering the both sides 40a and 40b of the evaporator 40 to the lower part of the evaporator 40. The guide means can be guide conduits 21 and 22 protruding outward from the both sides of the air conditioning case 10 and have a slope gradually decreasing along a direction of the airflow, as depicted in FIGS. 2 and 3.

The first path 31 can be divided into a cooling path 31a, which is a flow path passing through an upper tank 41 of the evaporator 40, wherein the air entered is primarily cooled, and a detour path 31b, which detours the evaporator 40. The air passed through the cooling path 31a is secondarily cooled by passing through a lower tank 42 of the evaporator 40, thereby improving cooling efficiency.

A drain hole 13 for discharging condensed water in the evaporator 40 to the outside of the air conditioning case 10 can be formed in a bottom wall 10b of the air conditioning case 10 corresponding to a location directly below the end part of the evaporator 40.

The heater core 60 can be disposed approximately parallel to the evaporator 40. Also, a sliding door 50 for controlling a closing/opening operation of a connection path 34 that connects the evaporator 40 and the heater core 60 and for sliding approximately parallel to the heater core 60 can be disposed in the connecting path 34.

In the air conditioner for a vehicle according to the embodiment of the present invention, an amount of air entering the evaporator 40 is increased and flow resistance is reduced since the air enters the evaporator 40 not only from below and above but also from the sides 40a and 40b of the evaporator by the airflow paths between the inner wall 10a of the air conditioning case 10 and the both sides 40a and 40b of the evaporator 40. Also, a uniform distribution of airflow at the lower part of the evaporator 40 can be achieved due to the airflows along the sides 40a and 40b of the evaporator 40. Here, the guide conduits 21 and 22 allow the air entered from the both sides 40a and 40b of the evaporator 40 through the second and third paths 32 and 33 to flow to the lower part of the evaporator 40. The air guided to the lower part of the evaporator 40 is cooled while passing through the evaporator 40.

Also, condensed water in the evaporator 40 can be easily discharged to the outside through the drain hole 13 by disposing the evaporator 40 having a downward slope along the direction of the airflow and forming the drain hole 13 in a bottom wall 10b of the air conditioning case 10 corresponding to a location directly below the end part of the evaporator 40, thereby improving water discharge ability.

A slim air conditioner for a vehicle can be manufactured by disposing the evaporator 40 approximately parallel to the heater core 60. The air conditioner can S further be slimmed by using the sliding door 50 for controlling the closing/opening operation of the connection path 34 that connects the evaporator 40 and the heater core 60.

Embodiments

Figure 4:
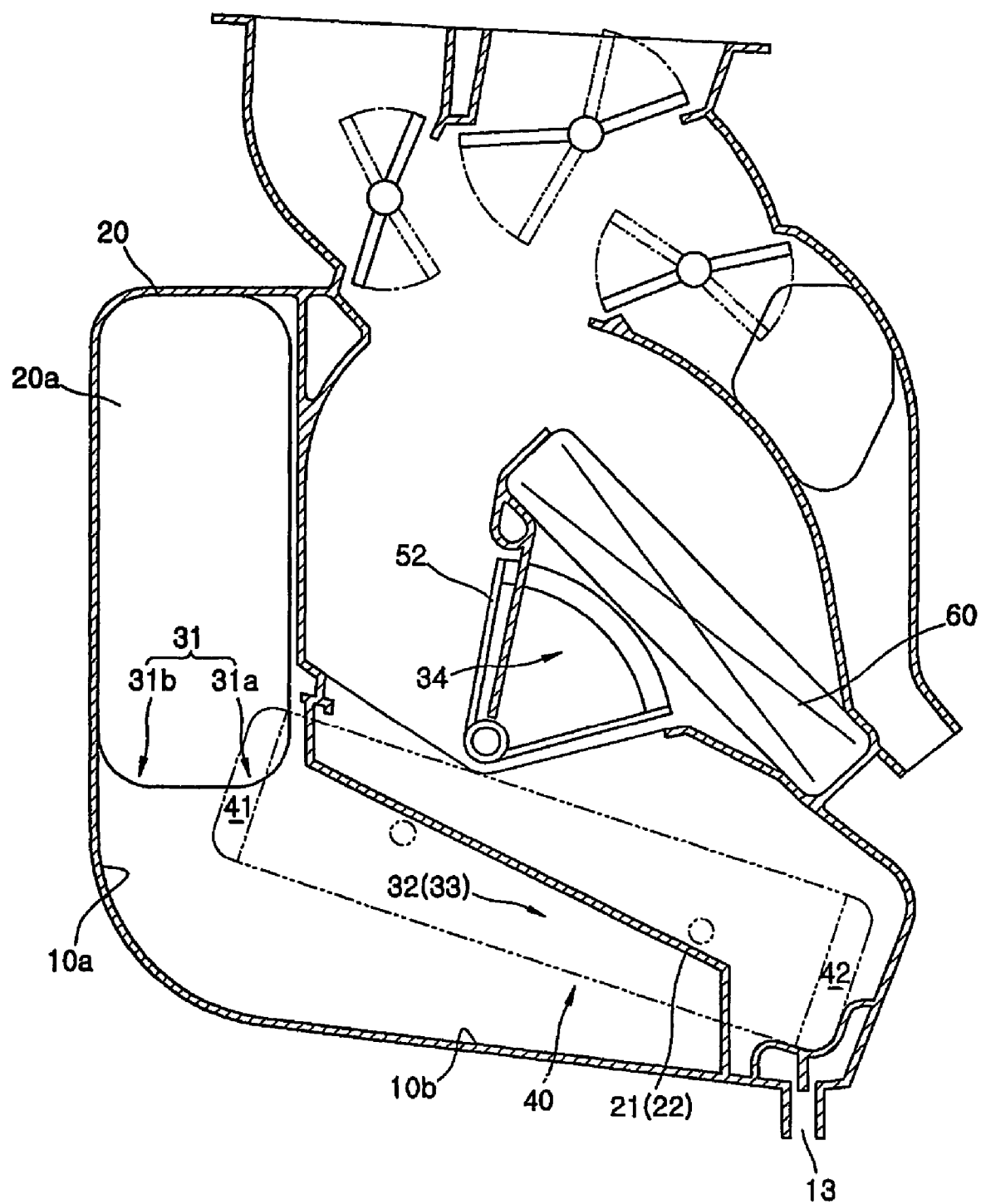
FIG. 4 is a cross-sectional view illustrating an air conditioner for a vehicle according to another embodiment of the present invention.

FIG. 4 is a cross-sectional view illustrating an air conditioner for a vehicle according to another embodiment of the present invention, wherein like reference numerals refer to the like elements of FIG. 2.

Comparing to the previous embodiment depicted in FIG. 2, the present embodiment is similar to the previous embodiment in that the air conditioning case 10 comprises the first path 31 through which air entered from the air inlet path 20 flows to the lower part of the evaporator 40, and second and third paths through which air flows to the lower part of the evaporator 40 after passing along the both sides of the evaporator 40. However, in the present embodiment, a rotating door 52 is employed for closing/opening the connection path 34 that connects the evaporator 40 and the heater core 60.

Figure 5:
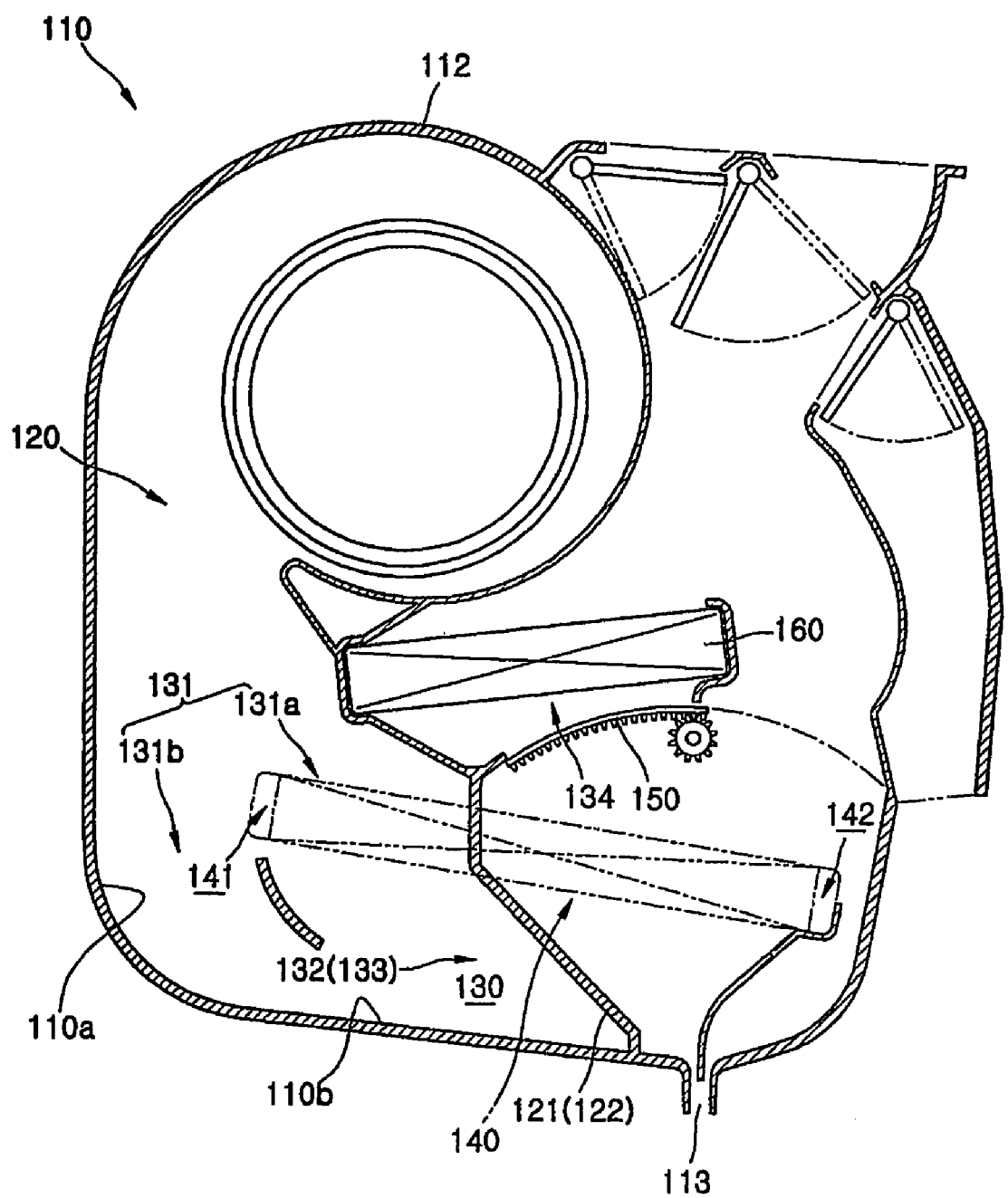
FIG. 5 is a cross-sectional view illustrating an air conditioner for a vehicle according to still another embodiment of the present invention.

In FIGS. 2 through 4, a semi-center mounting type, in which a blower unit is disposed on a side of the air conditioning case 10, is depicted, but the present invention is not limited thereto. FIG. 5 is a cross-sectional view illustrating an air conditioner of a center mounting type in which a blower unit is mounted on an air conditioning case 110, but features of the above embodiments can be equally applied. Referring to FIG. 5, an air conditioner for a vehicle of a center mounting type comprises an air conditioning case 110 in which an airflow path 130 is formed and a blower unit 112 that blows air toward an evaporator 140 and disposed on an upper part of the air conditioning case 110. The air conditioning case 110 includes the evaporator 140 and a heater core 160 sequentially disposed in the airflow path 130 and an air inlet path 120 that allows air to flow to the evaporator 140 from the blower unit 112.

The airflow path 130 is divided into a first path 131, through which air entered through the air inlet path 120 flows to a lower part of the evaporator 140, and second and third paths 132 and 133, through which air entered through the air inlet path 120 flows to the lower part of the evaporator 140 after passing through both sides of the evaporator 140 since both sides of the evaporator 140 are separated from an inner wall 110a of the air conditioning case 110. The second and third paths 132 and 133 are formed respectively between each of the sides of the evaporator 140 and an inner wall 110a of the air conditioning case 110. Also, the second and third paths 132 and 133 are guide conduits 121 and 122 formed protruding outward from the air conditioning case 110.

Similar to the structure of the air conditioner of the previous embodiments, the first path 131 can be divided into a cooling path 131a, which is a flow path passing through an upper tank 141 of the evaporator 40 in which the air entered is primarily cooled, and a detour path 131b, which detours the evaporator 140. The air passed through the cooling path 31a is secondarily cooled by passing through a lower tank 142 of the evaporator 140. A drain hole 113 for discharging condensed water from the evaporator 140 to the outside of the air conditioning case 110 can be formed in a bottom wall 110b of the air conditioning case 110 corresponding to a location directly below the end part of the evaporator 140.

The heater core 160 can be disposed approximately parallel to the evaporator 140. Also, a sliding door 150 for controlling the closing/opening operation of a connection path 134, which connects the evaporator 140 and the heater core 160, and for sliding approximately parallel to the heater core 160 can be disposed in the connection path 134.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An air conditioner for a vehicle, comprising:
   a blower unit that blows air toward an evaporator; and
   an air conditioning case which includes
      the evaporator and a heater core sequentially disposed in an airflow path, and
      an air inlet path that allows air to flow to the evaporator from the blower unit,
   wherein the air conditioning case includes
      a first path that allows air entered from the air inlet path to directly flow to a lower part of the evaporator, and
      second and third paths that allow the air entered from the air inlet path to flow to the lower part of the evaporator after passing along both lateral sides of the evaporator; and
   wherein the second and third paths are respectively disposed on the lateral sides of the evaporator and are connected to the first path.

2. The air conditioner for a vehicle of claim 1, wherein the first path includes
   a cooling path that passes through a portion of the evaporator, and
   a detour path that detours the evaporator.

3. The air conditioner for a vehicle of claim 1, wherein the second and third paths are guide conduits protruding outward from both lateral sides of the air conditioning case.

4. The air conditioner for a vehicle of claim 1, wherein
   a portion of the air inlet path is blocked by an upper tank of the evaporator, and
   the evaporator is mounted at a slope in a direction from the upper tank to a lower tank of the evaporator.

* * * * *